(12) United States Patent
Lim

(10) Patent No.: US 11,276,226 B2
(45) Date of Patent: Mar. 15, 2022

(54) ARTIFICIAL INTELLIGENCE APPARATUS AND METHOD FOR SYNTHESIZING IMAGES

(71) Applicant: LG ELECTRONICS INC., Seoul (KR)

(72) Inventor: Sekeun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 16/807,442

(22) Filed: Mar. 3, 2020

(65) Prior Publication Data

US 2021/0192837 A1 Jun. 24, 2021

(30) Foreign Application Priority Data

Dec. 19, 2019 (KR) .................. 10-2019-0170640

(51) Int. Cl.
*G06T 15/20* (2011.01)
*G06T 15/04* (2011.01)
*G06T 7/73* (2017.01)
*G06K 9/00* (2006.01)
*G06T 17/20* (2006.01)

(52) U.S. Cl.
CPC ........ *G06T 15/205* (2013.01); *G06K 9/00369* (2013.01); *G06T 7/73* (2017.01); *G06T 15/04* (2013.01); *G06T 17/20* (2013.01)

(58) Field of Classification Search
CPC ....... G06T 15/04; G06T 15/205; G06T 17/20; G06T 7/73; G06T 19/006; G06K 9/00369; G06K 9/3208; G06K 9/00208; G06K 9/00664; G06K 9/6271; G06K 9/6201

See application file for complete search history.

(56) References Cited

U.S. PATENT DOCUMENTS

| 10,621,779 | B1 * | 4/2020 | Topiwala | G06K 9/629 |
| 2014/0247279 | A1 * | 9/2014 | Nicholas | G06T 19/006 345/633 |
| 2016/0247017 | A1 * | 8/2016 | Sareen | G06T 19/00 |

* cited by examiner

*Primary Examiner* — Jennifer Mehmood
*Assistant Examiner* — Andrew Shin
(74) *Attorney, Agent, or Firm* — Lee, Hong, Degerman, Kang & Waimey PC

(57) ABSTRACT

Disclosed herein is an artificial intelligence apparatus including a memory configured to store image data, and a processor configured to acquire a human object image and a inanimate object image from the image data, generate a three-dimensional human model that matches the human object image, extract coordinate information of the image data, acquire a street view data matching the coordinate information, extract a reference object image, in which a inanimate object of the inanimate object image is photographed, from the street-view data, and acquire placement information of the human object image and the inanimate object image and place the three-dimensional human model on a street view image of the street view data using the placement information and the reference object image.

18 Claims, 14 Drawing Sheets

ARTIFICIAL INTELLIGENCE APPARATUS AND METHOD FOR SYNTHESIZING IMAGES

CROSS-REFERENCE TO RELATED APPLICATIONS

Pursuant to 35 U.S.C. § 119(a), this application claims the benefit of earlier filing date and right of priority to Korean Patent Application No. 10-2019-0170640, filed on Dec. 19, 2019, the contents of which are all hereby incorporated by reference herein in their entirety.

BACKGROUND OF THE INVENTION

1. Field of the Invention

The present disclosure relates to an artificial intelligence apparatus and a method for synthesizing images.

2. Discussion of the Related Art

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence device.

Recently, service companies that provide map information provide street view (or road view) services.

A user may recall the memories while searching for a place that the user has traveled by using the street view service.

However, there is a problem in that the photographs or images taken at the place where the user has traveled do not appear in the street view image.

Accordingly, there is an increasing need for a service of synthesizing a photograph or a video taken at a place where the user has traveled into the street view image.

SUMMARY OF THE INVENTION

The present disclosure aims to solve the above and other problems.

An object of the present disclosure is to provide an artificial intelligence apparatus and method for synthesizing image data into a street view image.

An object of the present disclosure is to provide an artificial intelligence apparatus and a method for extracting a human object image of image data and synthesizing the human object image into a street view image.

An object of the present disclosure is to provide an artificial intelligence apparatus and a method for converting a human object of image data into a three-dimensional model and synthesizing the three-dimensional model into a street view image.

According to an embodiment of the present disclosure, an artificial intelligence apparatus includes a memory configured to store image data, and a processor configured to acquire a human object image and a inanimate object image from the image data, generate a three-dimensional human model that matches the human object image, extract coordinate information of the image data, acquire a street view data matching the coordinate information, extract a reference object image, in which a inanimate object of the inanimate object image is photographed, from the street-view data, and acquire placement information of the human object image and the inanimate object image and place the three-dimensional human model on a street view image of the street view data using the placement information and the reference object image.

Furthermore, according to an embodiment of the present disclosure, an image synthesis method includes storing image data, acquiring a human object image and a inanimate object image from the image data, generating a three-dimensional human model that matches the human object image, extracting coordinate information of the image data, acquiring a street view data matching the coordinate information, extracting a reference object image, in which a inanimate object of the inanimate object image is photographed, from the street-view data, acquiring placement information of the human object image and the inanimate object image, and placing the three-dimensional human model on a street view image of the street view data using the placement information and the reference object image.

DETAILED DESCRIPTION OF THE PREFERRED EMBODIMENTS

Figure 1:
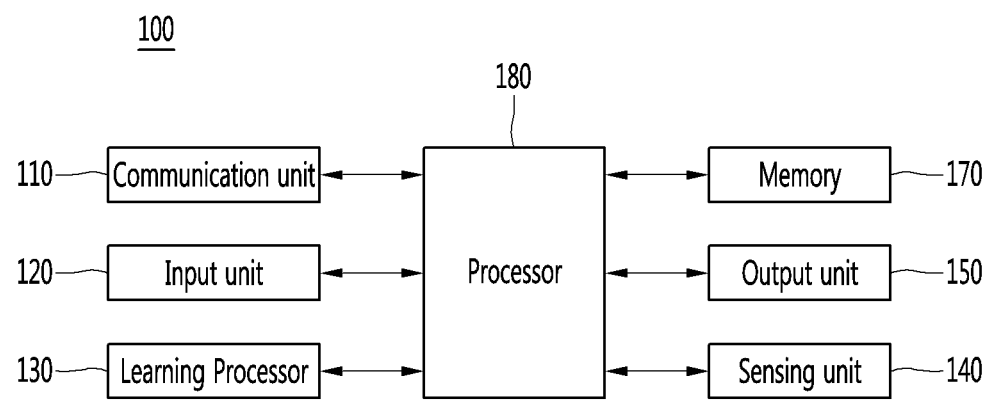
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving device, and may travel on the ground through the driving device or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing interface 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing interface 140 may acquire at least one of internal information about the AI device 100, ambient environment information about the AI device 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display device for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
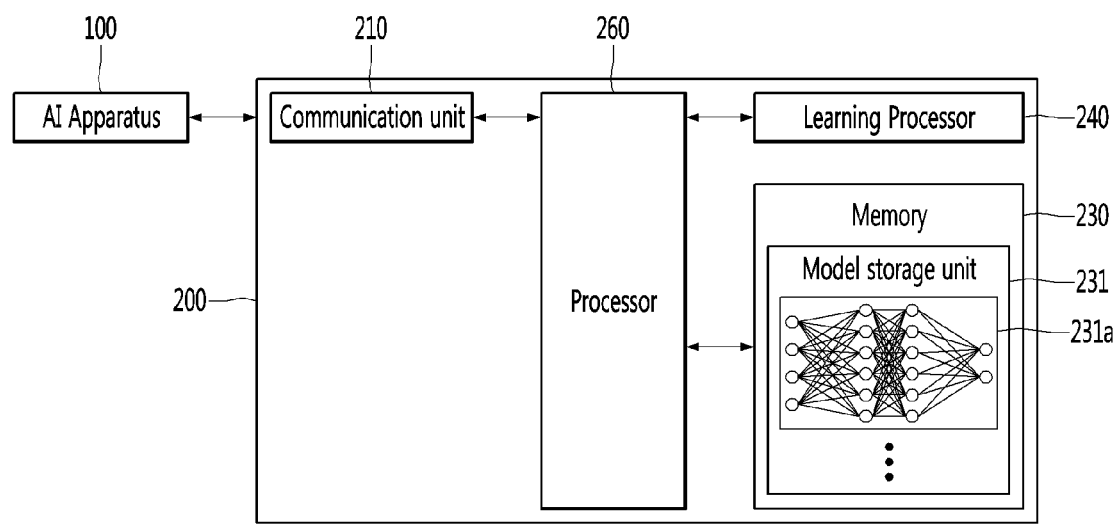
FIG. 2 illustrates an AI server according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage device 231. The model storage device 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
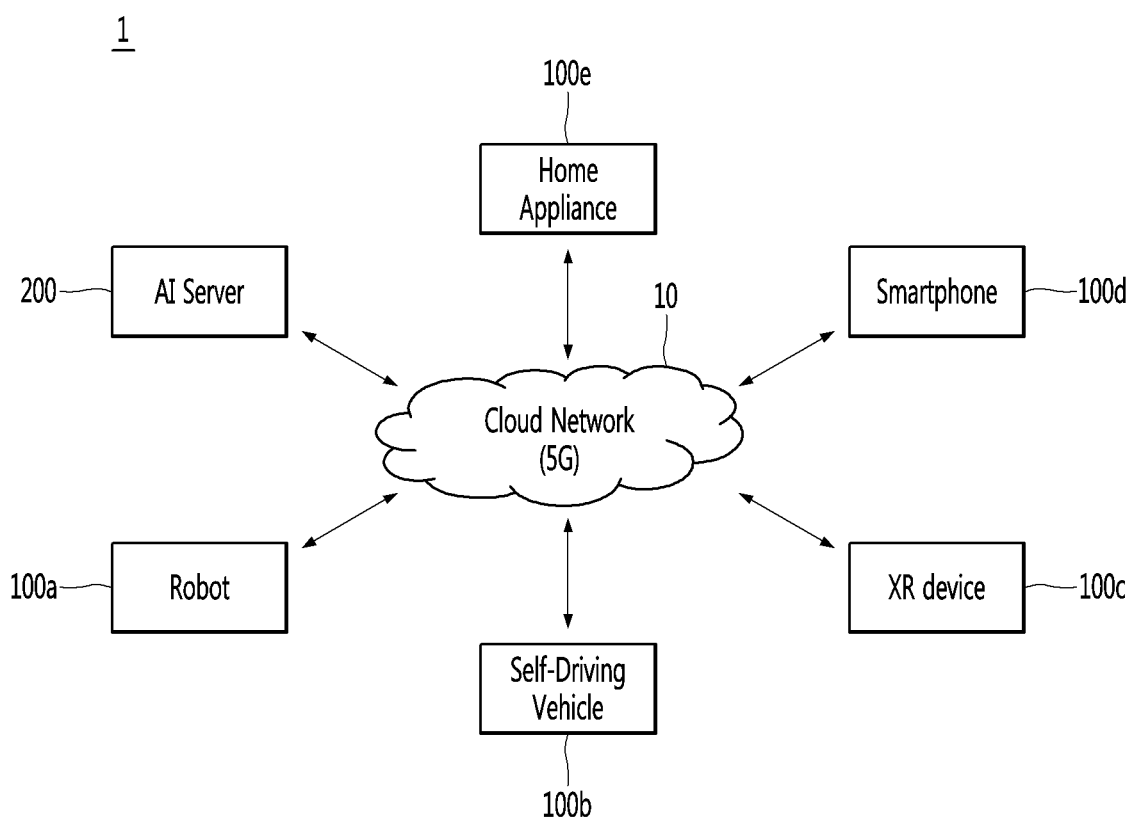
FIG. 3 illustrates an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving device such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving device such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving device of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
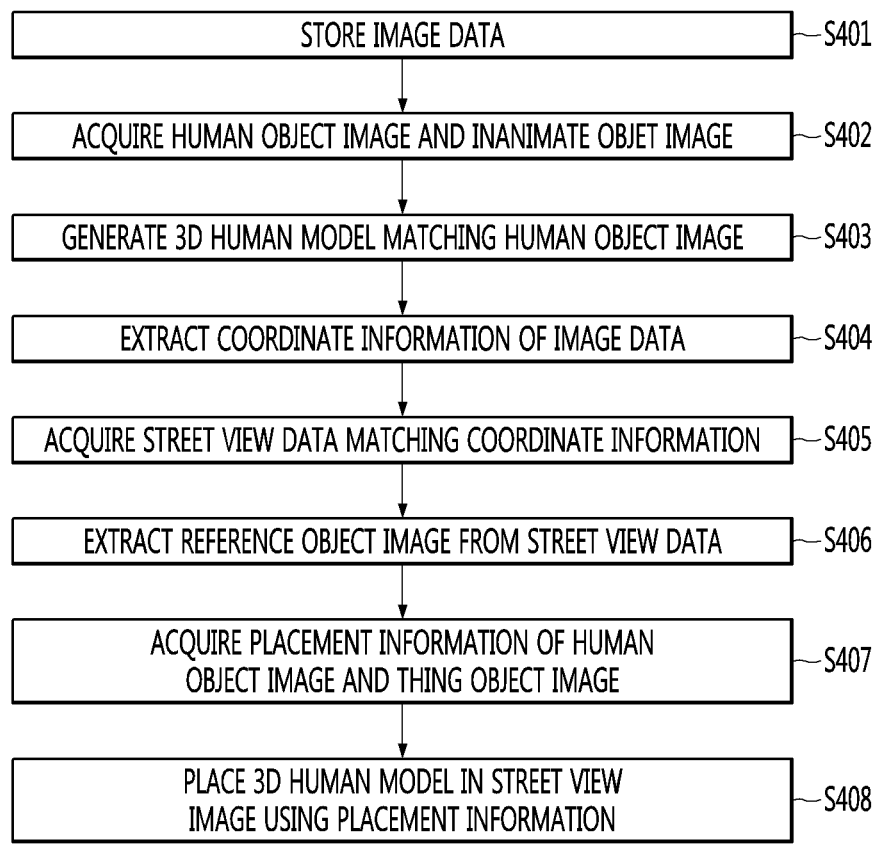
FIG. 4 is a flowchart illustrating a method of synthesizing images according to an embodiment of the present disclosure.

FIG. 4 is a flowchart illustrating a method of synthesizing images according to an embodiment of the present disclosure.

The memory 170 may store image data (S401).

The image data may be a photograph or image data taken by a camera of the input interface 120 or may include photographic or image data received through the communication interface 110.

On the other hand, the processor 180 may acquire a human object image and a inanimate object image from the image data (S402).

The processor 180 may acquire an image for at least one or more human objects and an image for at least one or more inanimate objects from the image data.

The human object image may be an image for a human included in the image data.

Furthermore, the inanimate object image may be an image for things except for a human. The inanimate object image may be an image for a thing that may be representative of the image data.

The processor 180 may acquire the human object image and the inanimate object image from the image data using an object recognition model that recognizes and outputs the human object image and the inanimate object image included in a predetermined image data.

The object recognition model may be an artificial neural network (ANN) model used in machine learning. The object recognition model may be composed of artificial neurons (nodes) that form a network by combining synapses. The image recognition model may be defined by a coupling pattern between neurons of another layer, a learning process of updating model parameters, and an activation function of generating an output value.

The object recognition model may include an input layer, an output layer, and optionally one or more hidden layers. Each layer may include one or more neurons, and the artificial neural network may include synapses that links neurons to neurons. In the artificial neural network, each neuron may output a function value of an activation function for input signals input through synapses, weights, and deflections.

The object recognition model may be generated through supervised learning, unsupervised learning, or reinforcement learning according to a learning method.

For example, the object recognition model may output at least one or more human object images and inanimate object images using image data including a photograph or image data as input data, and output human information including information on at least one of the age, gender, body size and posture information, human region location, and human outline information of each recognized human.

The object recognition model will be described with reference to the following drawings.

Figure 5:
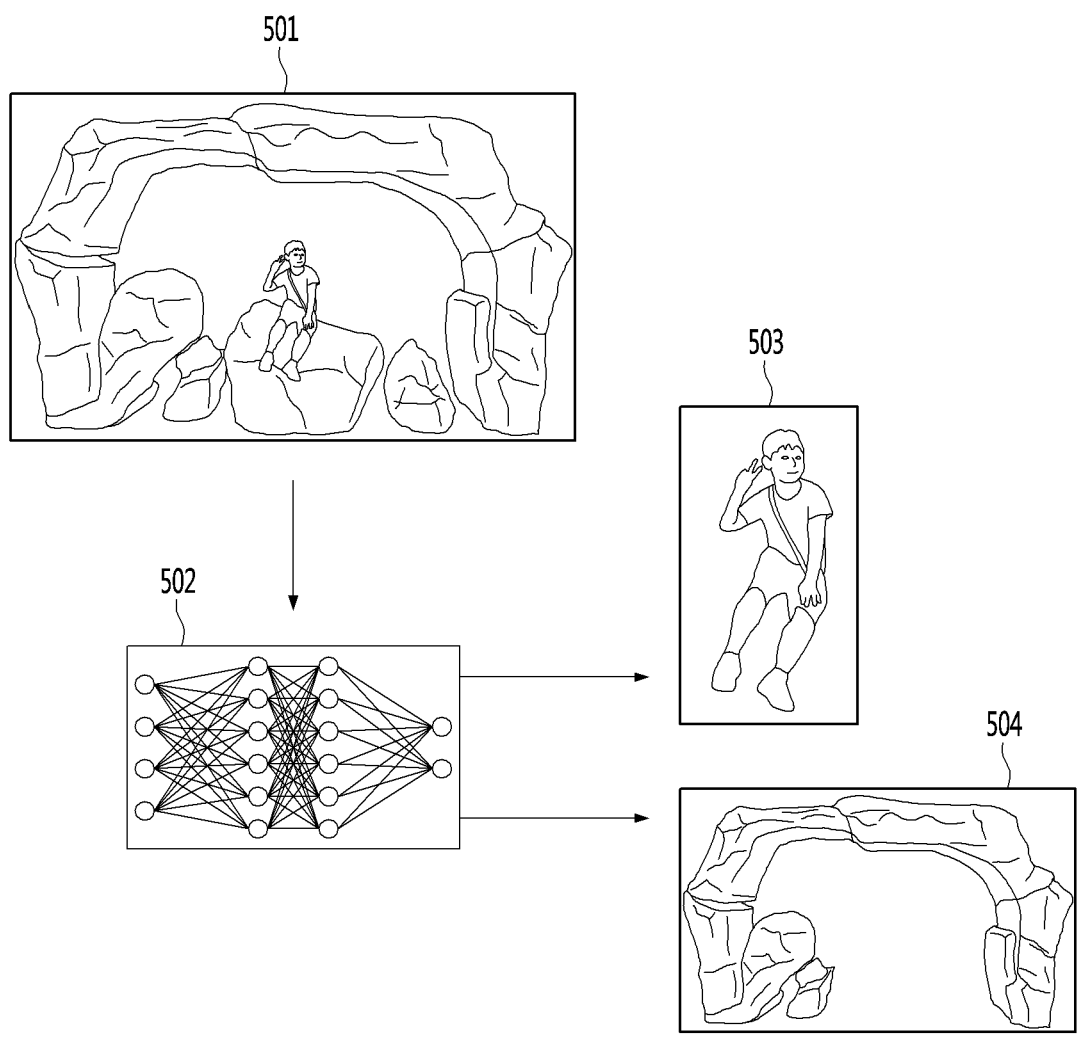
FIG. 5 is a diagram for describing an object recognition model according to an embodiment of the present disclosure.

FIG. 5 is a diagram for describing an object recognition model according to an embodiment of the present disclosure.

An object recognition model 502 is an artificial neural network-based model and may be a model that specifies each of at least one human object image and a inanimate object image included in the image data using image data including a photograph or a video as input data.

The object recognition model 502 may be a model trained by the learning processor 240 of the artificial intelligence server 200 or a model trained by the learning processor 130 of the artificial intelligence apparatus 100.

The processor 180 may provide the image data 501 to the object recognition model 502 to acquire a human object image and a inanimate object image included in the image data 501.

The object recognition model 502 may recognize and output the human object image 503 and the inanimate object image 504 included in the image data 501.

When outputting the object recognition image, the object recognition model 502 may output human information including information on at least one of the age, gender, body size and posture information, human region location, and human outline information of each recognized human.

The body size information may include information on a height or weight of the recognized human.

In addition, the posture information may include location information on at least one of eyes, neck, shoulders, elbows, wrists, fingers, solar plexus, navel, thighs, knees, ankles, heels, and toes of the recognized human.

Also, the human region location may include information on the location of a region occupied by a human object in the image data. In addition, the human outline information may include information on the contours of the region occupied by the human object. The processor 180 may extract the human object image 502 by acquiring the human region location and the human outline information of the human object output by the object recognition model 502.

Meanwhile, the processor 180 may generate a 3D human model that matches the human object image (S403).

The processor 180 may generate a 3D human model that matches the human object image to convert the human object image, which is a 2D image, into a 3D image.

The 3D human model may be a model of which a texture is mapped to the 3D mesh model.

Figure 6:
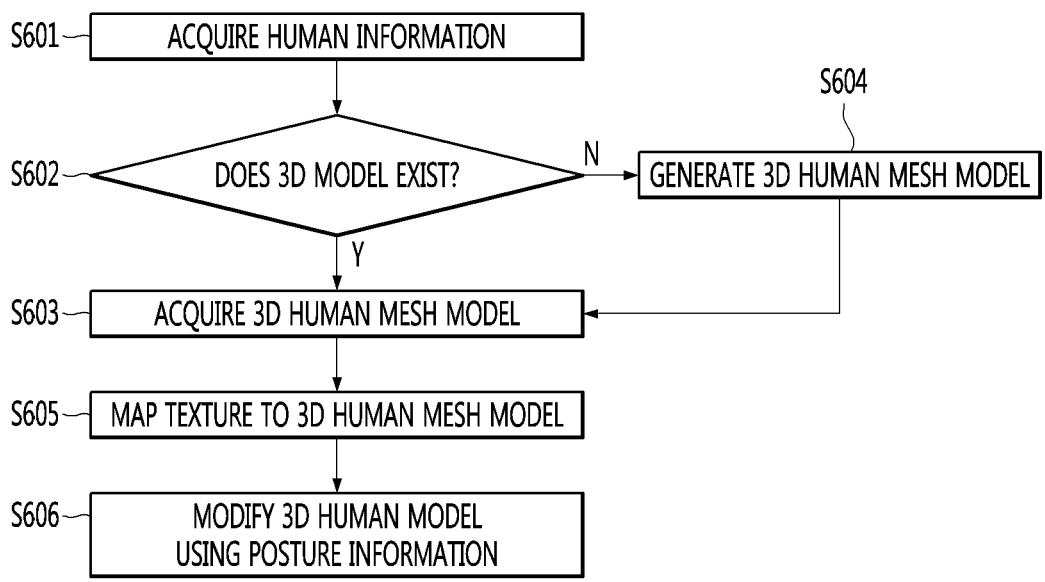
FIG. 6 is a flowchart illustrating a method of generating a 3D human model according to an embodiment of the present disclosure.

FIG. 6 is a flowchart illustrating a method of generating a 3D human model according to an embodiment of the present disclosure.

The processor 180 may acquire human information including at least one of the age, gender, body size, and posture information of a human from the human object image (S601).

The processor 180 may provide image data including a photograph or image data as input data of the object recognition model using the object recognition model, and acquire human information including information on at least one of the human object image output from the object recognition model, the human object image, age, gender, body size and posture information of each recognized human, human region location, and a human outline.

The processor 180 may acquire a 3D human mesh model matching the human information from a 3D mesh model database storing at least one 3D human mesh model classified by age, gender, and body size (S602).

Meanwhile, the 3D mesh model database may be a database stored in the memory 170. That is, the memory 170 may store at least one 3D human mesh model classified by age, gender, and body size. When the processor 180 cannot acquire a 3D human mesh model matching the human information from the 3D mesh model database, the processor 180 may generate a 3D human mesh model based on the human information (S604).

The processor 180 may generate a 3D human mesh model based on the human information.

The 3D mesh model may be a model representing a 3D shape of a target object in a 3D space by connecting a plurality of polygonal units having 3D coordinate values. In this case, the polygon unit may be a triangle, but is not limited thereto. The 3D human mesh model may be a model representing a 3D shape of a human. Furthermore, the 3D human mesh model may be a model to which a texture is not mapped.

The processor 180 may generate a 3D human mesh model based on at least one of the age, gender, body size, and posture information included in the human information.

For example, the processor 180 may generate a 3D human mesh model mapped to the human object by using a model generation algorithm which generates a 3D human mesh model according to the age, gender, and body size of the human.

Meanwhile, the processor 180 may acquire texture mapping information to be mapped to the 3D human mesh model based on the human object image, and generate the 3D human model by mapping a texture to the 3D human mesh model based on the generated texture mapping information (S605).

The processor 180 may express the three-dimensional human mesh model in detail by applying the color and texture of the two-dimensional image data to the surface of the three-dimensional human mesh model through texture mapping Meanwhile, a body part which is not photographed may exist in the human object image depending on the situation at the time at which a human is photographed.

Therefore, the processor 180 may generate texture information for the body part which is not photographed by using a texture information generation model that generates texture information on a predetermined body part not included in the human object image. The texture information generation model may also generate texture information on the photographed body part.

That is, when the human object image is an image in which a predetermined body part is not photographed, the processor 180 may acquire texture mapping information on the body part that is not photographed using the texture information generation model.

On the other hand, the texture information generation model may be an artificial neural network (ANN) model used in machine learning.

For example, the texture information generation model may include a first artificial neural network model that outputs color and layout information for each body part based on the photographed body part image of the human object image. In addition, the texture information generation model may include a second artificial neural network model that outputs color and layout information of each unphotographed body part by using color and layout information of each body part identified from the first artificial neural network model as input data.

In addition, the texture information generation model may output texture information to be mapped to the 3D human mesh model based on color and layout information of each body part.

Figure 7:
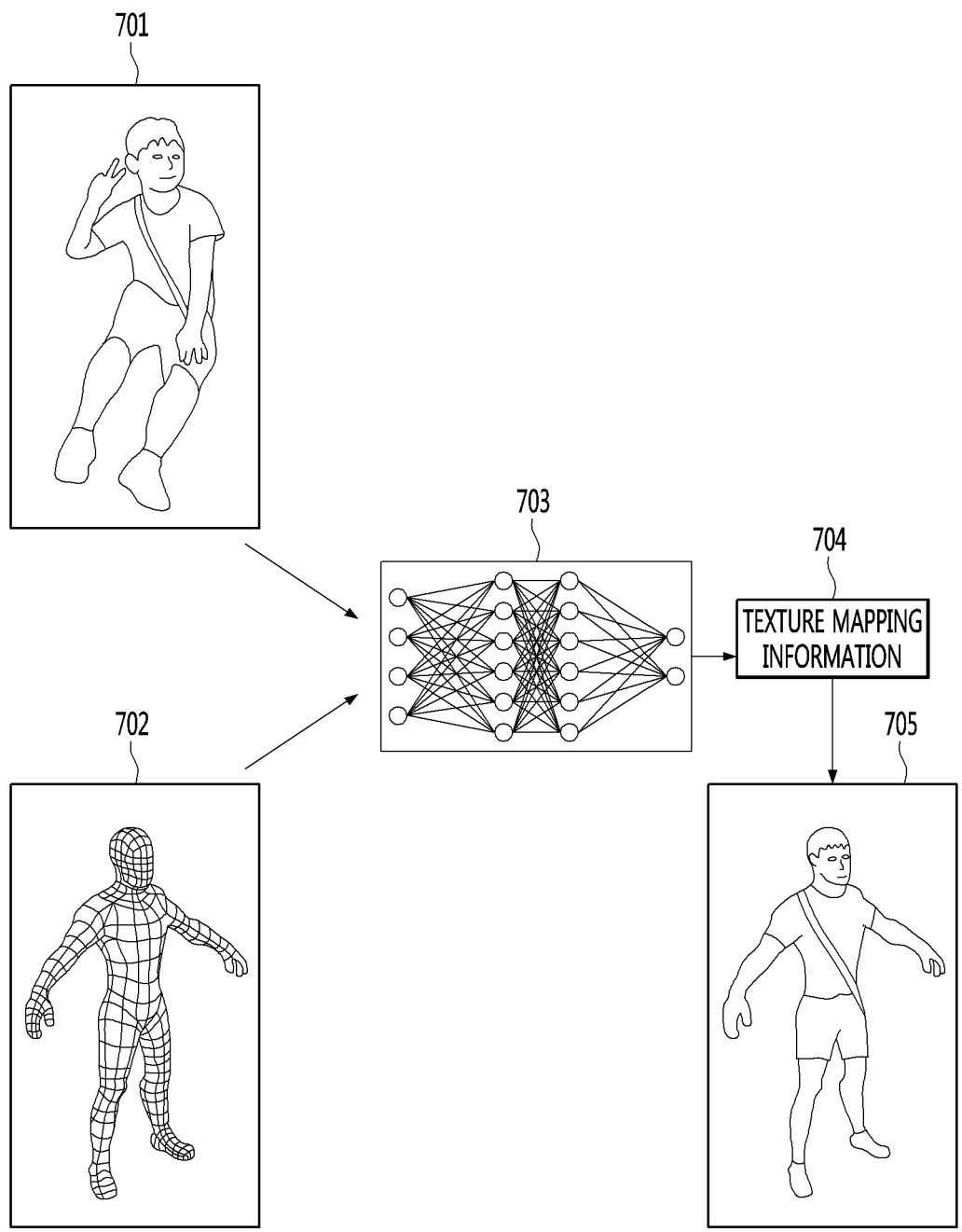
FIG. 7 is a diagram for describing a texture information generation model according to an embodiment of the present disclosure.

FIG. 7 is a diagram for describing a texture information generation model according to an embodiment of the present disclosure.

The processor 180 may provide a human object image 701 and a three-dimensional human mesh model 702 to a texture information generation model 703 as input data, and output texture mapping information 704, which is information on a texture to be mapped to a three-dimensional human mesh model 702.

In addition, the processor 180 may generate the 3D human model 705 by mapping the texture to the 3D human mesh model based on the texture mapping information 704.

The processor 180 may modify the 3D human model to have the posture of the human object image by using the posture information included in the human information (S606).

The posture information may include location information on at least one of eyes, neck, shoulders, elbows, wrists, fingers, solar plexus, navel, thighs, knees, ankles, heels, and toes of the human.

Meanwhile, the 3D human model may include location information on at least one of eyes, neck, shoulders, elbows, wrists, fingers, solar plexus, navel, thighs, knees, ankles, heels, and toes of a virtual 3D human.

Figure 8:
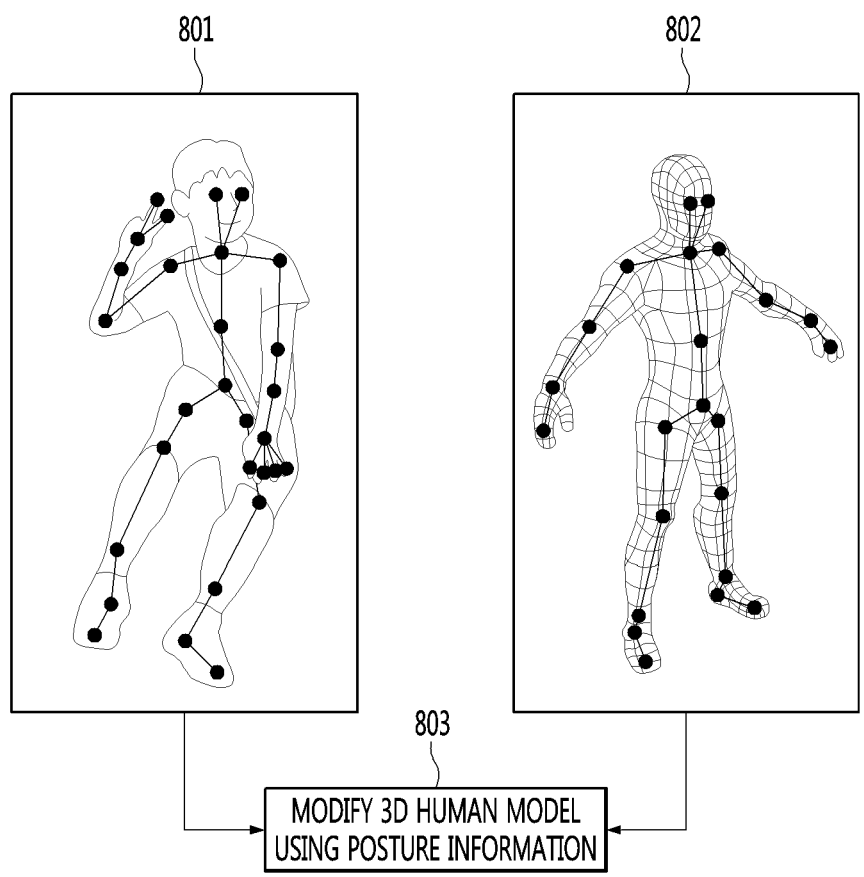
FIG. 8 is a diagram illustrating a method of converting a 3D human model based on posture information according to an embodiment of the present disclosure.

Referring to FIG. 8, the processor 180 may modify the 3D human model to have a posture of the human object image using the posture information included in the human information by modifying the posture information of the 3D human model 802 based on the posture information on the human object image (803).

When the posture information of the human object image 801 has 2D coordinate values, the processor 180 may modify the posture information of the 3D human model 802 by converting the posture information having 3D coordinate values when posture information of the human object image 801 has 2D coordinate values.

On the other hand, the processor 180 may extract the coordinate information of the image data (S404).

The coordinate information may include information on at least one of latitude, longitude, and altitude.

The image data may include coordinate information. For example, when the image data is data generated by performing photography using a camera of the artificial intelligence apparatus 100, the image data may include GPS coordinate information of the artificial intelligence apparatus 100 as metadata at the time of photographing.

Therefore, the processor 180 may extract coordinate information, which is information on a location at the time when the image is captured, from the metadata of the image data.

The processor 180 may acquire street view data that matches the coordinate information (S405).

The street view data may be data that may be received through an external server (not shown) that provides a street view service. The street view service may include a service for providing an image photographed using a 360-degree camera at a predetermined location. Meanwhile, the street view service may be referred to as a road view service.

The processor 180 may request the external server to provide the street view data together with coordinate information through the communication interface 110 and receive the street view data matching the coordinate information through the communication interface 110.

The street view data may include a street view image photographed at a predetermined position and viewpoint information. The viewpoint information may include a tilt value, a pan value, and a zoom value as information on the street view viewpoint.

The processor 180 may extract a reference object image in which a inanimate object of the inanimate object image is photographed from the street view data (S406).

The processor 180 may extract an object as a reference to synthesize a 3D human model into the street view image. For example, the processor 180 may extract the reference object, which is the same object as the inanimate object, from the street view image, and synthesize a 3D human model into the street view image based on the reference object.

Figure 9:
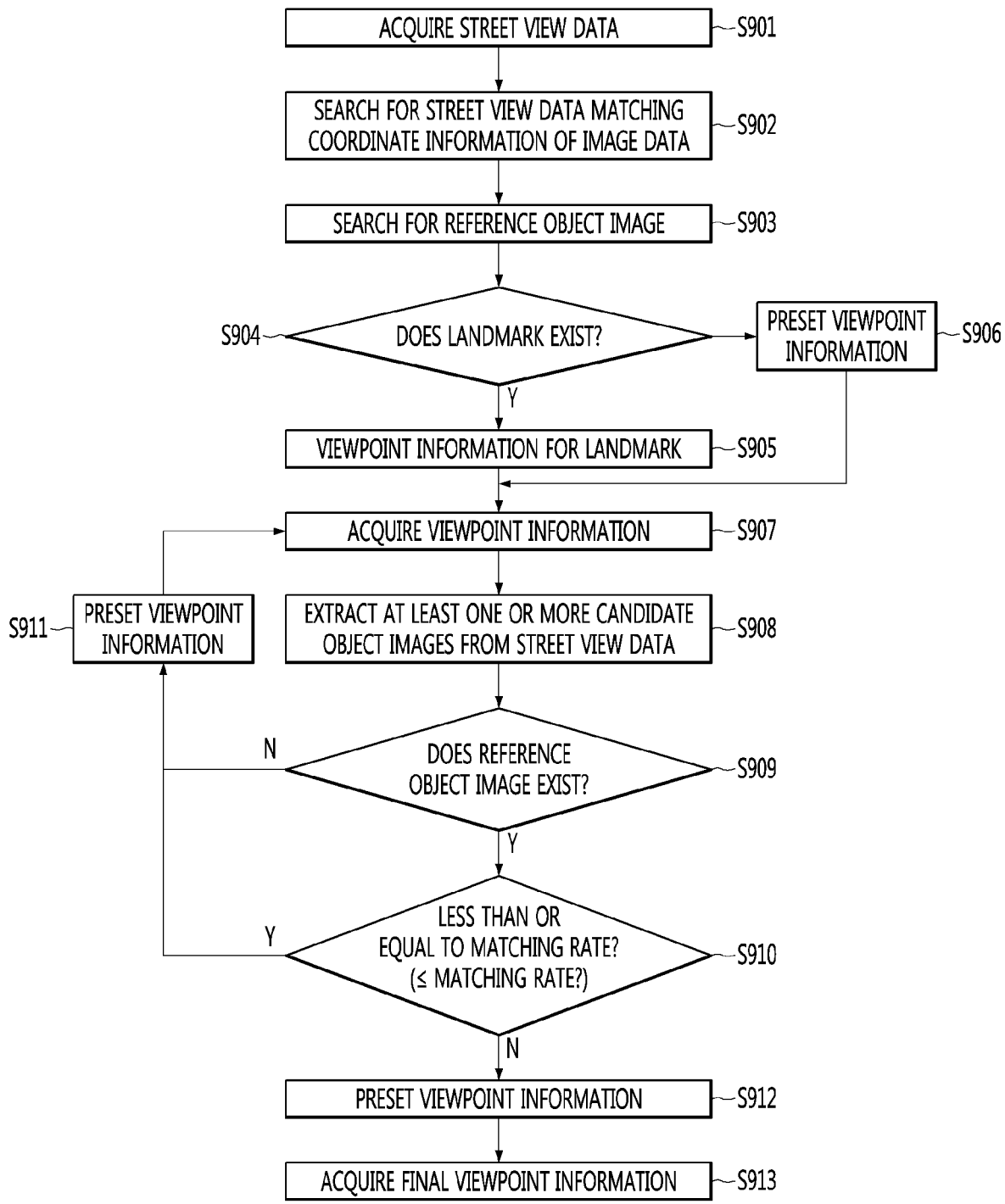
FIG. 9 is a flowchart illustrating a method of extracting a reference object image according to an embodiment of the present disclosure.

FIG. 9 is a flowchart illustrating a method of extracting a reference object image according to an embodiment of the present disclosure.

The processor 180 may acquire street view data (S901).

The street view data may be data that may be received through an external server (not shown) that provides a street view service.

In addition, the processor 180 may search for street view data that matches the coordinate information of the image data (S902).

The processor 180 may starch for the street view data having a coordinate value corresponding to the latitude and longitude information of the image data in the street view data.

The processor 180 may search for a reference object image in the street view which matches the coordinate information (S903).

The processor 180 may acquire viewpoint information from which the reference object image, in which the inanimate object of the inanimate object image is photographed, is extracted.

The viewpoint information is direction information of a camera displaying a street view image and may include a tilt value, a pan value, and a zoom value.

The processor 180 may search for the reference object image while changing the viewpoint information in the street view data.

The street view data may include viewpoint information preset as a default value. The processor 180 may acquire viewpoint information, which is preset as a default value, from the street view data. Therefore, the processor 180 may search for the reference object image while changing the initial viewpoint information preset as the default value.

In addition, the processor 180 may acquire a street view image from the street view data based on the viewpoint information. The processor 180 may determine whether a landmark object pre-registered exists in the street view data (S904).

When there is a pre-registered landmark object in the street view data having predetermined latitude and longitude information, the processor 180 may acquire viewpoint information for the pre-registered landmark object image and the landmark object (S905).

In addition, the processor 180 may determine whether the inanimate object image is a pre-registered landmark object image, and when the inanimate object image is a pre-registered landmark object image, set the viewpoint information by using the location information of the landmark.

The landmark image may include an image of a thing that is representative of a predetermined place or area or is distinguished from another place or area.

The memory 170 may store location information of at least one landmark and a landmark object image. In addition, the processor 180 may transmit coordinate information of the image data to an external server and acquire the landmark object image and the location information of the landmark matching the coordinate information through the communication interface 110.

The processor 180 may determine whether the inanimate object image is an image acquired by photographing the same thing as the pre-registered landmark object image and determine whether the inanimate object image is a pre-registered landmark image.

The processor 180 may set viewpoint information for acquiring a street view image in which the landmark object is visible using location information of the landmark.

The processor 180 may acquire a street view image based on the set viewpoint information, and acquire a reference object image, in which the inanimate object of the inanimate object image is photographed, from the street view image. Therefore, when the inanimate object image is a landmark object image, the processor 180 may acquire the reference object image without changing the viewpoint information several times.

On the other hand, when the landmark object pre-registered does not exist in the street view data, the processor 180 may acquire viewpoint information preset to a predetermined default value (S906).

The processor 180 may acquire the pre-registered landmark object image and viewpoint information for the landmark object or viewpoint information preset to the predetermined default value (S907).

The processor 180 may extract at least one candidate object image from the street view data (S908).

The processor 180 may extract at least one candidate object image from the street view image acquired based on the viewpoint information from the street view data.

The candidate object image may include images of at least one or more things included in the street view image.

The processor 180 may compare each of the at least one or more candidate object images with the inanimate object image to determine whether there is a reference object image acquired by photographing the same thing as a thing included in the inanimate object image (S909).

The processor 180 may change the viewpoint information when the reference object image does not exist in at least one candidate object image (S911).

For example, the processor 180 may change at least one of a tilt value, a pan value, and a zoom value included in the viewpoint information.

Accordingly, the processor 180 may acquire a new street view image based on the changed viewpoint information and change the viewpoint information until the reference object image exists in the new street view image.

When the reference object image exists, the processor 180 may acquire a matching rate by comparing the reference object image with the inanimate object image.

For example, the processor 180 may acquire the matching rate of shape information by comparing shape information of the reference object image with shape information of the inanimate object image.

The processor 180 may determine whether a matching rate between the reference object image and the inanimate object image is equal to or less than a preset matching rate (S910).

The processor 180 may change the viewpoint information when the matching rate between the reference object image and the inanimate object image is equal to or less than the preset matching rate (S911).

Therefore, the processor 180 may acquire a reference object image in which the matching rate with the inanimate object image is satisfied, while changing the viewpoint information.

The processor 180 may extract an image in which a matching rate of the inanimate object image exceed a preset matching rate as a reference object image (S912).

In addition, the processor 180 may acquire viewpoint information from which the reference object image is extracted (S913).

In addition, the processor 180 may acquire location information in a space in which the reference object image exists on the street view data.

Therefore, the processor 180 may acquire viewpoint information from which the reference object image, in which the inanimate object of the inanimate object image is photographed, extracted from the street view data.

Figure 10A:
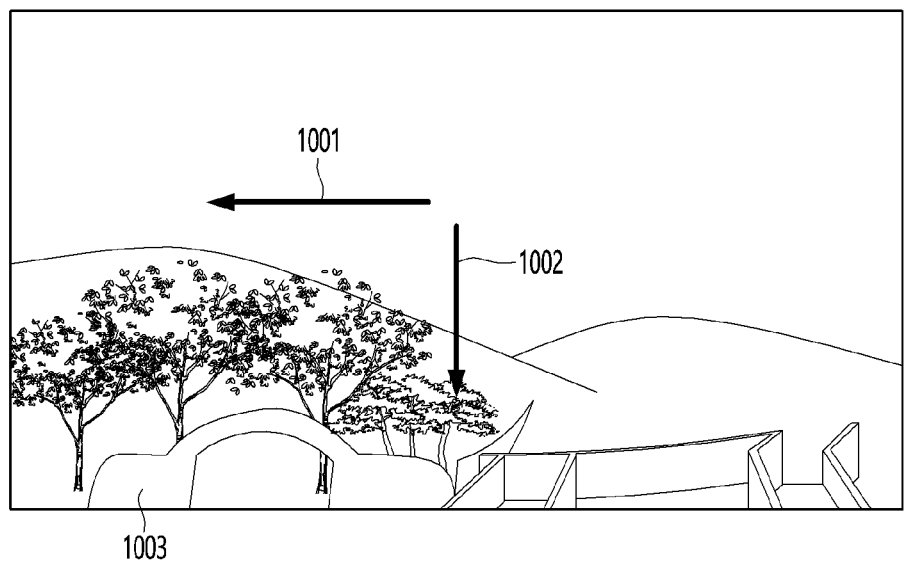
FIGS. 10A and 10B are diagrams for describing a method of extracting a reference object image according to an embodiment of the present disclosure.

Referring to FIG. 10A, the processor 180 may extract the candidate object image 1003 from the street view image acquired from the street view data based on the viewpoint information.

The processor 180 may compare the candidate object image 1003 with the inanimate object image to determine whether the candidate object image 1003 includes the same inanimate object as that of the inanimate object image.

When the candidate object image 1003 is not the reference object image, the processor 180 may change the viewpoint information by changing the tilt value 1001 in an up-down direction (1001) and changing the pan value in a left-right direction (1002).

Figure 10B:
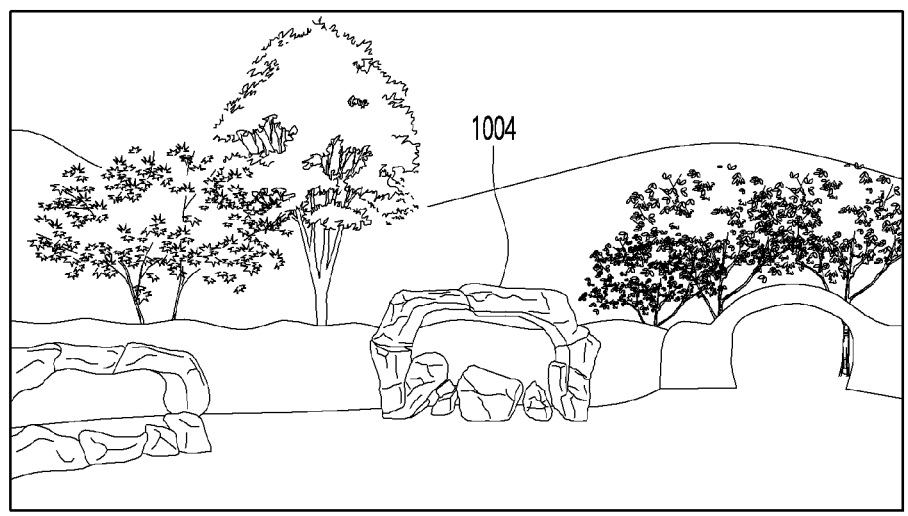

Referring to FIG. 10B, the processor 180 may acquire a new street view image based on the changed viewpoint information.

The processor 180 may acquire the candidate object image 1004 from the street view image.

The processor 180 may determine whether the candidate object image 1004 may be a reference object image by comparing the candidate object image 1004 with the inanimate object image.

The processor 180 may determine whether the candidate object image 1004 includes the same reference object as the inanimate object of the inanimate object image.

When the candidate object image 1004 includes the reference object, the processor 180 may determine a matching rate between the candidate object image 1004 and the inanimate object image.

The processor 180 may extract the candidate object image 1004 as a reference object image when the matching rate between the candidate object image 1004 and the inanimate object image is greater than or equal to a preset matching rate.

In addition, the processor 180 may acquire viewpoint information from which the reference object image is extracted.

The processor 180 may acquire a street view image by using the viewpoint information from which the reference object image is extracted, and place and synthesize a 3D human model on and into the acquired street view image.

On the other hand, the processor 180 may acquire placement information of the human object image and the inanimate object image (S407).

The processor 180 may place the 3D human model in the street view image by using the placement information (S408).

The processor 180 may use the placement information between the human object image and the inanimate object image of the image data to place the 3D human model based on the reference object image of the street view image.

Therefore, the processor 180 may adjust the three-dimensional human model by reflecting the placement distance and the proportion information of the human object image and the inanimate object image and perform natural image synthesis by placing the adjusted three-dimensional human model in the street view image.

Figure 11:
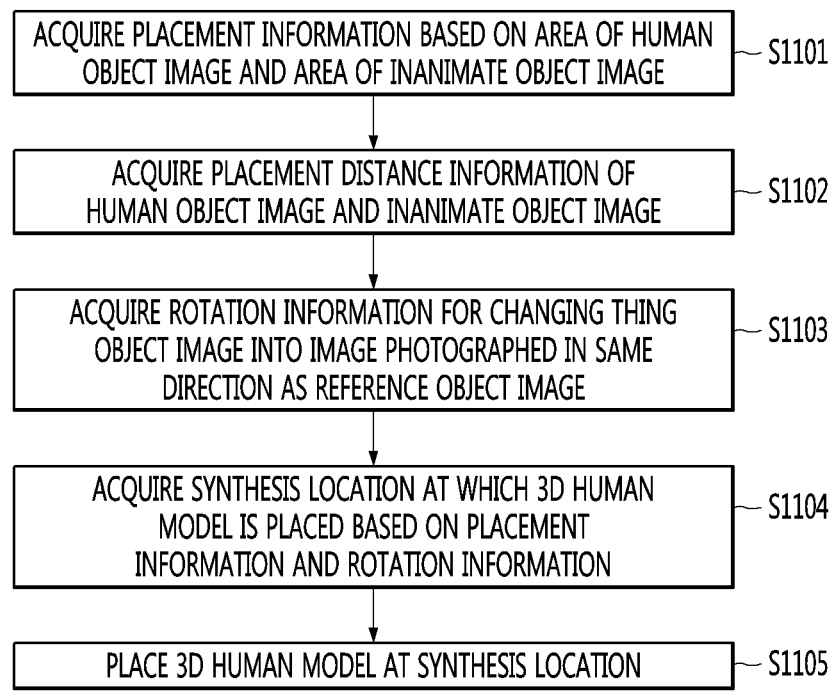
FIG. 11 is a flowchart illustrating a method of synthesizing a 3D human model into a street view image according to an embodiment of the present disclosure.

FIG. 11 is a flowchart illustrating a method of synthesizing a 3D human model into a street view image according to an embodiment of the present disclosure.

The processor 180 may acquire placement proportion information based on the area of the human object image and the area of the inanimate object image (S1101).

Figure 12:
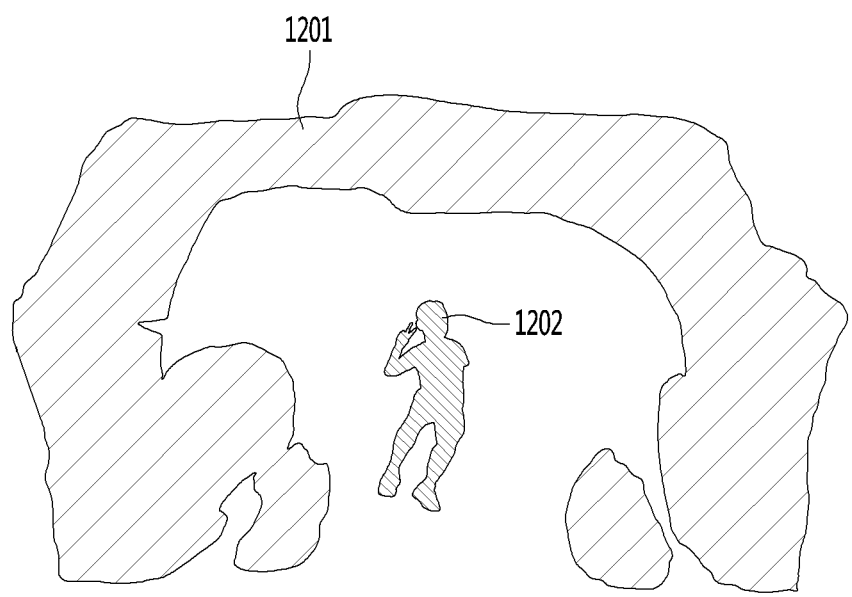
FIG. 12 is a diagram for describing a method of acquiring placement proportion information, according to an embodiment of the present disclosure.

Referring to FIG. 12, the processor 180 may acquire a first area 1201 of a inanimate object image and a second area 1202 of a human object image. The processor 180 may acquire placement proportion information by acquiring a ratio between the first area and the second area.

Therefore, the processor 180 may determine the area of the 3D human model based on the placement proportion information according to the area of the reference object image included in the street view image, so that the 3D human model may be naturally synthesized. In addition, the processor 180 may acquire placement distance information of the human object image and the inanimate object image (S1102).

The placement distance information may include distance information from a predetermined point related to the human object image to a predetermined point related to the inanimate object image.

Figure 13:
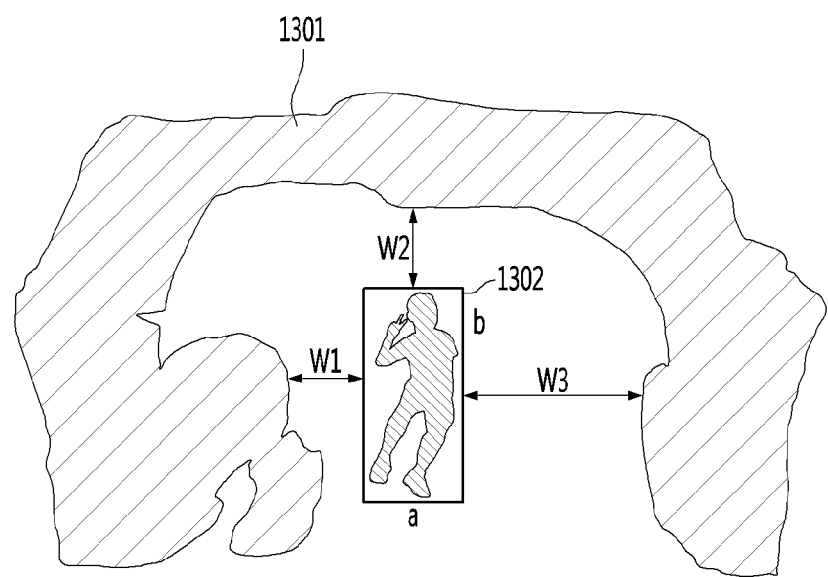
FIG. 13 is a diagram for describing a method of acquiring placement street information, according to an embodiment of the present disclosure.
Figure 14:
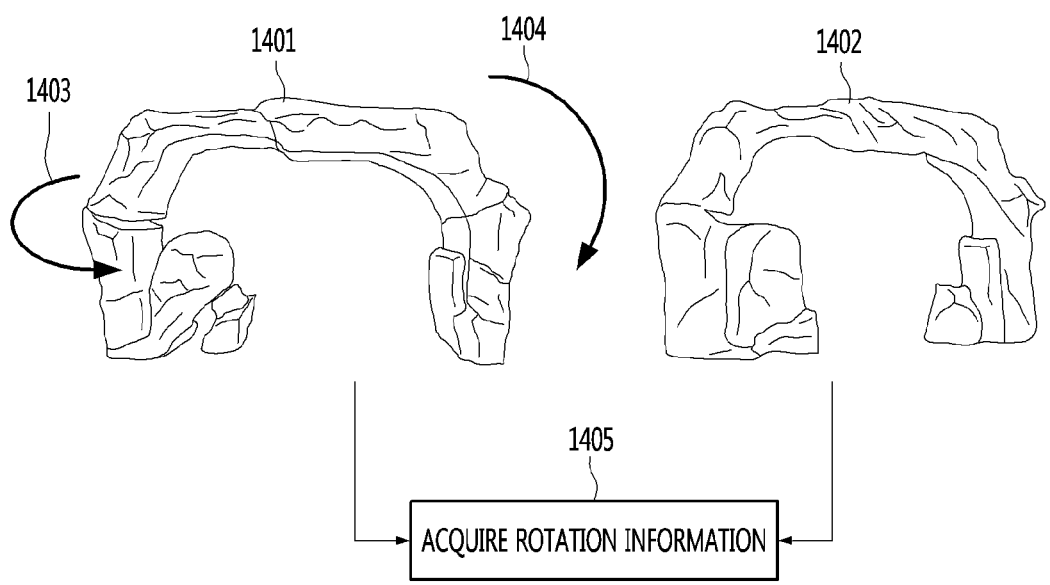
FIG. 14 is a diagram for describing a method of acquiring rotation information, according to an embodiment of the present disclosure.

For example, referring to FIG. 13, the processor 180 may acquire a rectangular border 1302 including the inanimate object image.

The processor 180 may acquire a horizontal length "a" and a vertical length "b" of the rectangular border 1302. In addition, the processor 180 may acquire ratio information of the horizontal length and the vertical length of the rectangular border 1302.

The processor 180 may acquire distances W1, W2, and W3 from the center of each side of the rectangular border 1302 to the inanimate object image. In addition, the processor 180 may acquire ratio information between the acquired pieces of distance information W1, W2, and W3.

The processor 180 may acquire placement distance information including the horizontal length "a", the vertical length "b", and the distances W1, W2 and W3 from the center of each side of the rectangular border 1302 to the inanimate object image.

Therefore, the processor 180 may determine the distance between the reference object image included in the street view image and the 3D human model based on the placement distance information, so that the 3D human model is capable of being synthesized at the correct position of the street view image.

The processor 180 may acquire rotation information for changing the inanimate object image into an image photographed in the same direction as the reference object image (S1103).

For example, the processor 180 may acquire rotation information for changing the inanimate object image into an image photographed in the same direction as the reference object image by rotating the inanimate object image vertically or horizontally based on a predetermined center point.

Referring to FIG. 13, the processor 180 may acquire rotation information for rotating a inanimate object image 1401 in an up-down direction 1403 or a left-right direction 1404 based on a predetermined center point to convert the inanimate object image 1401 into an image photographed in the same direction as the reference object image 1402 (1405).

The rotation information may include angle information rotated in the up-down direction 1403 and angle information rotated in the left-right direction 1404.

The processor 180 may acquire a synthesis location at which the 3D human model is to be placed based on the placement information and the rotation information (S1104).

The processor 180 may rotate the 3D human model based on the rotation information. Accordingly, the 3D human model may be viewed as photographed in the same direction as the reference object image.

In addition, the processor 180 may adjust the area of the 3D human model according to the area of the reference object image using the placement proportion information included in the placement information, and adjust the distance between the reference object image and the 3D human model by using the placement distance information included in the placement information.

Accordingly, the processor 180 may change the angle at which the 3D human model is viewed, change the area of the 3D human model, and change the distance from the reference object image, thus acquiring a synthesis location at which the 3D human model is to be disposed in the street view data. The synthesis location may mean location information at which a 3D human model is synthesized in the street view image viewed from a predetermined viewpoint.

Figure 15A:
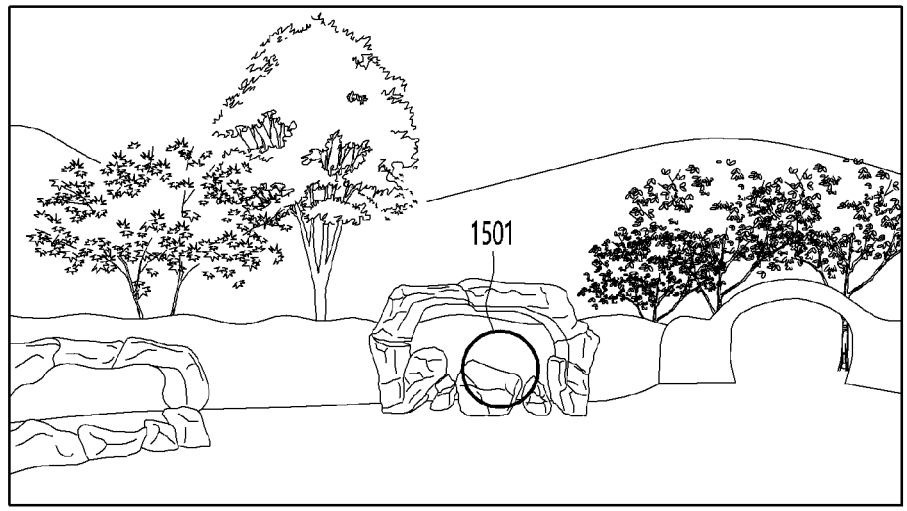
FIGS. 15A and 15B are diagrams for describing an image synthesis process according to an embodiment of the present disclosure.
Figure 15B:
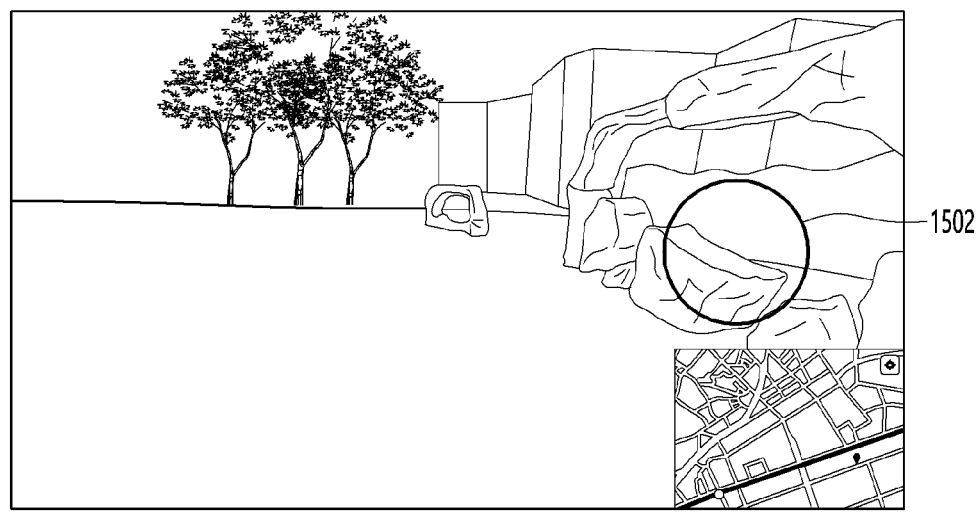

FIGS. 15A and 15B are diagrams for describing a synthesis location according to an embodiment of the present disclosure.

Referring to FIG. 15A, the processor 180 may acquire a synthesis location 1501 at which a 3D human model is synthesized in a street view image shown in a first viewpoint information from which the reference object image is extracted.

In addition, referring to FIG. 15B, the processor 180 may acquire a synthesis location 1502 at which a 3D human model is synthesized in a street view image shown in a second viewpoint information from which the reference object image is extracted.

Accordingly, the processor 180 may acquire information about the synthesis position at which the 3D human model is synthesized even when the viewpoint information of the street view data is changed. Meanwhile, the processor 180 may place the 3D human model at the synthesis position (S1105).

The processor 180 may change the angle and the size of the 3D human model based on the placement information and the rotation information to place the 3D human model at the synthesis position, thus performing image synthesis.

Meanwhile, the processor 180 may place the human object image in the street view image when up and down rotation angle information and left and right rotation angle information included in the rotation information are less than or equal to a preset rotation angle, thereby synthesizing the actually photographed 2D human image.

When the 2D human image is a video, the processor 180 may play a human object video in the street view image.

In addition, the processor 180 may use an image synthesis model when the image is synthesized by placing the 3D human model in the street view image.

The image synthesis model may be an artificial neural network model trained to generate a new image by using the street view image and the 3D human model as input data, or may be implemented using a generative adversarial network (GAN) model. When the image synthesis model is implemented using a generative host adversarial network (GAN) model, the image synthesis model may be composed of a synthetic image generator and a discriminator.

Figure 16:
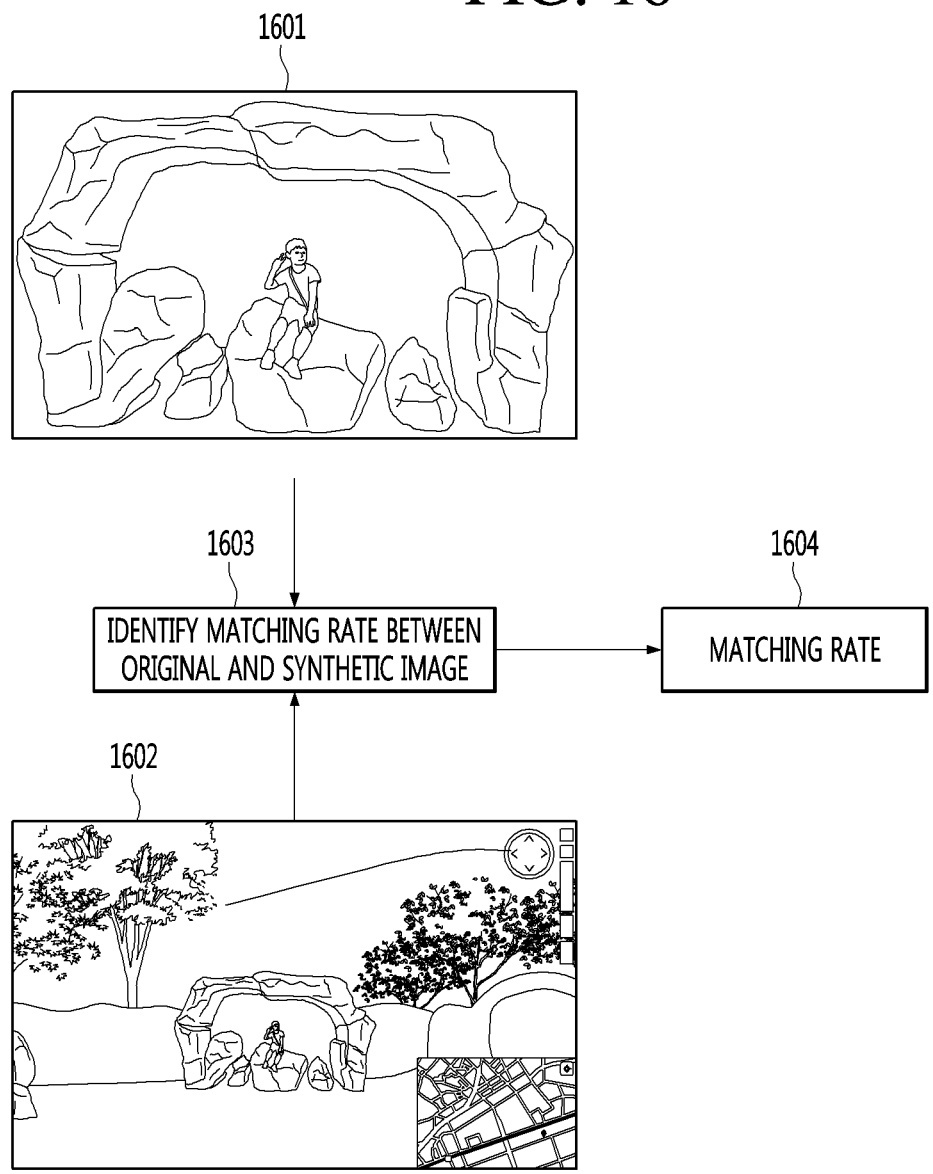
FIG. 16 is a diagram for describing an image synthesis model according to an embodiment of the present disclosure.

FIG. 16 is a diagram for describing an image synthesis model, according to an embodiment of the present disclosure.

The synthetic image generator may generate an image 1602 in which the 3D human model is synthesized at a predetermined synthesis position of the street view image. Meanwhile, the discriminator may determine a matching rate between an original image 1601 and the synthesized image 1602 (1603). The processor 180 may allow the synthetic image generator to generate the synthetic image until the matching rate output by the separator satisfies a predetermined reference.

Therefore, the processor 180 may acquire a natural synthetic image acquired by synthesizing the 3D human model at a predetermined synthesis position of the street view image using the image synthesis model.

Figure 17A:
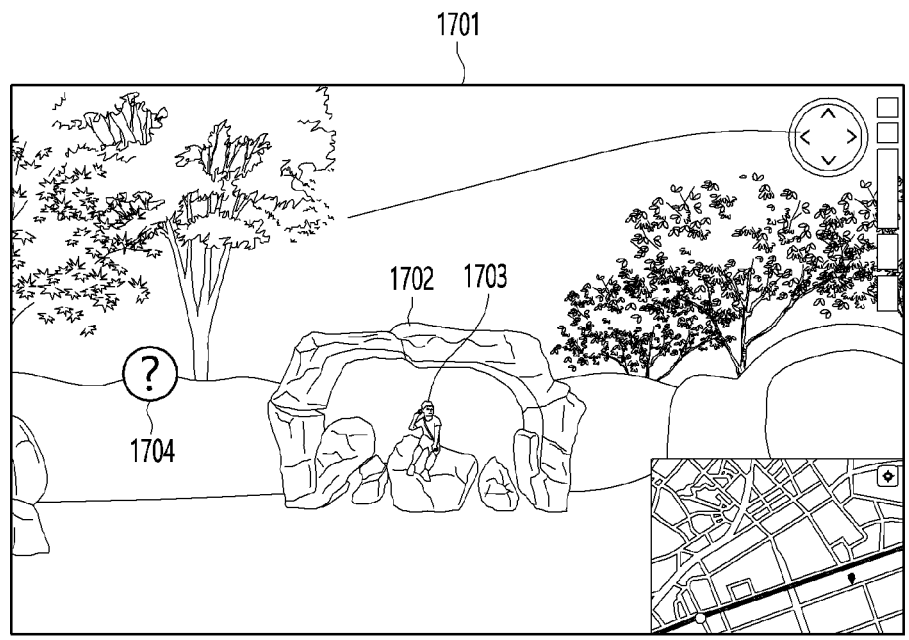
FIGS. 17A and 17B are diagrams illustrating a synthesized street view image according to an embodiment of the present disclosure.
Figure 17B:
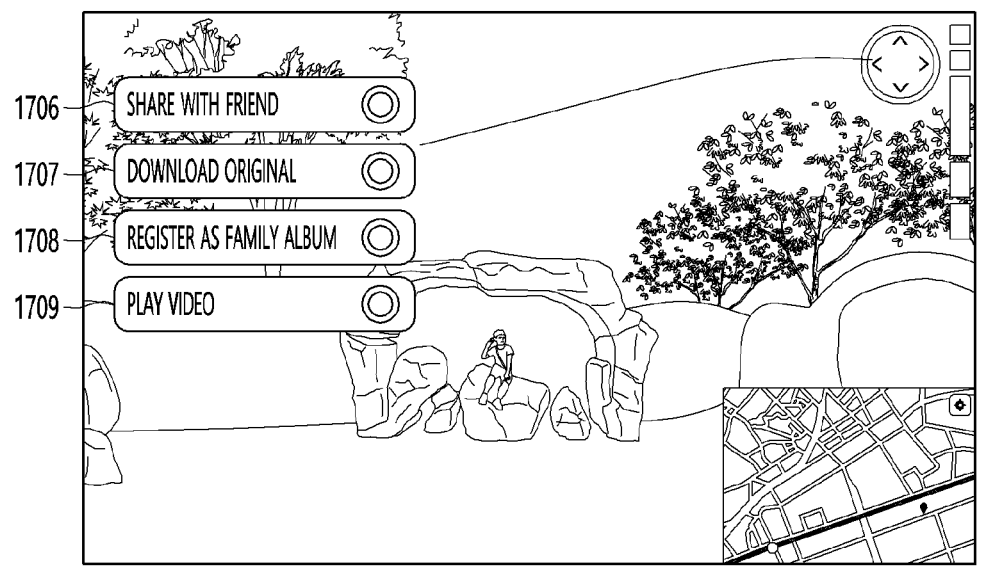

FIGS. 17A and 17B are diagrams illustrating a street view image in which a 3D human model is placed, according to an embodiment of the present disclosure.

The processor 180 may perform image synthesis by placing a 3D human model 1703 in the street view image based on a reference object image 1702.

In addition, the processor 180 may provide various interfaces such that a user may utilize a synthesized street view image.

For example, the processor 180 may include a button interface 1704 that induces a click on the synthesized street view image 1701.

When the processor 180 receives an input for the button interface 1704, the processor 180 may provide various menu interfaces that enable usage of the synthesized street view image 1701.

The processor 180 may provide a sharing interface 1706 for transmitting the synthesized street view image 1705 to an external device (not shown) through the communication interface 110. Therefore, the user may share the synthesized street view image through an SNS service.

In addition, the processor 180 may provide a download interface 1707 for storing the synthesized street view image 1705 in the memory 170.

In addition, the processor 180 may tag predetermined classification information with respect to the synthesized street view image 1705. The processor 180 may provide a classification interface 1708 for tagging the synthesized street view image 1705 as a family album classification.

Meanwhile, when the synthesized street view image 1705 is an image in which a human object video is synthesized, the processor 180 may provide a video play interface 1709 for reproducing the human object video.

According to the embodiment of the present disclosure, a live image may be provided by synthesizing a human object of an image into a street view image.

According to the embodiment of the present disclosure, by converting a human object of an image into a three-dimensional model and synthesizing the 3D model into the street view image, thus providing a natural synthetic image even when the angle of the street view image is changed.

According to the embodiment of the present disclosure, an accurate synthesized image may be provided by searching for a reference object that matches the inanimate object of an image in the street view image and synthesizing the human object based on the reference object.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the artificial intelligence apparatus.

What is claimed is:

1. An artificial intelligence apparatus comprising:
a memory configured to store image data; and
a processor configured to acquire a human object image and an inanimate object image from the image data,
generate a three-dimensional human model that matches the human object image,
extract coordinate information of the image data, acquire a street view data matching the coordinate information,
extract a reference object image, in which an inanimate object of the inanimate object image is photographed, from the street-view data,
acquire placement information of the human object image and the inanimate object image and place the three-dimensional human model on a street view image of the street view data using the placement information and the reference object image,
wherein for acquiring the placement information the processor is configured to: acquire placement proportion information based on an area of the human object image and an area of the inanimate object image, and acquire placement distance information of the human object image and the inanimate object image, and wherein placing of the three-dimensional human model on the street view image uses the placement information including the placement proportion information and the placement distance information.

2. The artificial intelligence apparatus of claim 1, wherein the processor is configured to acquire human information including at least one of age, gender, body size, and posture information of a human from the human object image, generate a three-dimensional human mesh model based on the human information and generate the three-dimensional human model based on the 3D human mesh model.

3. The artificial intelligence apparatus of claim 2, wherein the memory includes a three-dimensional mesh model database configured to store at least one three-dimensional human mesh model classified by age, gender and body size, and wherein the processor is configured to acquire a three-dimensional human mesh model matching the human information from the three-dimensional mesh model database and generate the three-dimensional human model based on the three-dimensional human mesh model.

4. The artificial intelligence apparatus of claim 2, wherein the processor is configured to acquire texture mapping information to be mapped to the three-dimensional human mesh model based on the human object image and generate the three-dimensional human model by mapping a texture to the three-dimensional human mesh model based on the texture mapping information.

5. The artificial intelligence apparatus of claim 2, wherein the processor is configured to modify the three-dimensional human model to have a posture of the human object image by using the posture information included in the human information.

6. The artificial intelligence apparatus of claim 1, wherein the processor is configured to acquire, from the street view data, viewpoint information from which the reference object image is extracted.

7. The artificial intelligence apparatus of claim 6, wherein the processor is configured to:

compare the inanimate object image with the reference object image, and change the viewpoint information when a matching rate between the inanimate object image and the reference object image is less than or equal to a preset matching rate.

8. The artificial intelligence apparatus of claim 6, wherein the processor is configured to:

determine whether the inanimate object image is a pre-registered landmark object image, and set the viewpoint information by using location information of a landmark when the inanimate object image is the pre-registered landmark object image.

9. The artificial intelligence apparatus of claim 1, wherein the processor is configured to:

acquire rotation information for changing the inanimate object image and the reference object image into an image photographed in the same direction; and rotate the three-dimensional human model based on the rotation information to place the three-dimensional human model on the street view image.

10. An image synthesis method comprising:

storing image data;

acquiring a human object image and an inanimate object image from the image data;

generating a three-dimensional human model that matches the human object image;

extracting coordinate information of the image data;

acquiring a street view data matching the coordinate information;

extracting a reference object image, in which an inanimate object of the inanimate object image is photographed, from the street-view data;

acquiring placement information of the human object image and the inanimate object image; and placing the three-dimensional human model on a street view image of the street view data using the placement information and the reference object image, wherein the acquiring of the placement information includes:

acquiring placement proportion information based on an area of the human object image and an area of the inanimate object image; and acquiring placement distance information of the human object image and the inanimate object image, and wherein the placing of the three-dimensional human model on the street view image uses the placement information including the placement proportion information and the placement distance information.

11. The image synthesis method of claim 10, wherein the generating of the three-dimensional human model includes:

acquiring human information including at least one of age, gender, body size, and posture information of a human from the human object image;

generating a three-dimensional human mesh model based on the human information; and generating the three-dimensional human model based on the 3D human mesh model.

12. The image synthesis method of claim 11, wherein the generating of the three-dimensional human mesh model includes:

acquiring a three-dimensional human mesh model matching the human information from the three-dimensional mesh model database; and generating the three-dimensional human model based on the three-dimensional human mesh model, and wherein the three-dimensional mesh model database is configured to store at least one three-dimensional human mesh model classified by age, gender and body size.

13. The image synthesis method of claim 11, wherein the generating of the three-dimensional human model based on the three-dimensional human mesh model includes:

acquiring texture mapping information to be mapped to the three-dimensional human mesh model based on the human object image; and generating the three-dimensional human model by mapping a texture to the three-dimensional human mesh model based on the texture mapping information.

14. The image synthesis method of claim 11, further comprising:

modifying the three-dimensional human model to have a posture of the human object image by using the posture information included in the human information.

15. The image synthesis method of claim 10, wherein the extracting of the reference object image includes acquiring, from the street view data, viewpoint information from which the reference object image is extracted.

16. The image synthesis method of claim 15, wherein the extracting of the reference object image includes:

comparing the inanimate object image with the reference object image; and changing the viewpoint information when a matching rate between the inanimate object image and the reference object image is less than or equal to a preset matching rate.

17. The image synthesis method of claim 15, wherein the extracting of the reference object image includes:

determining whether the inanimate object image is a pre-registered landmark object image; and setting the viewpoint information by using location information of a landmark when the inanimate object image is the pre-registered landmark object image.

18. The image synthesis method of claim 10, wherein the placing of the three-dimensional human model on the street view image includes:

acquiring rotation information for changing the inanimate object image and the reference object image into an image photographed in the same direction; and rotating the three-dimensional human model based on the rotation information to place the three-dimensional human model on the street view image.

\* \* \* \* \*